United States Patent [19]

Steinkraus

[11] Patent Number: 4,496,599
[45] Date of Patent: Jan. 29, 1985

[54] PROCESS FOR PRODUCING DEFATTED AND DEBITTERED SOYBEAN MEAL

[75] Inventor: Keith H. Steinkraus, Geneva, N.Y.

[73] Assignee: Cornell Research Foundation, Inc., Ithaca, N.Y.

[21] Appl. No.: 474,104

[22] Filed: Mar. 10, 1983

[51] Int. Cl.³ ............................................... A23J 1/14
[52] U.S. Cl. ..................................... 426/430; 426/656
[58] Field of Search ....................... 426/430, 634, 656; 260/123.5

[56] References Cited

U.S. PATENT DOCUMENTS

| | | | |
|---|---|---|---|
| 1,260,656 | 3/1918 | Bollmann | 426/430 |
| 3,043,826 | 7/1962 | Beaber et al. | 426/430 |
| 3,520,868 | 7/1970 | Henderson et al. | 426/430 |
| 3,721,569 | 3/1973 | Steinkraus | 426/430 |
| 3,734,901 | 5/1973 | Hayes et al. | 260/123.5 |
| 3,925,569 | 12/1975 | Daftary | 426/634 |
| 3,971,856 | 7/1976 | Daftary | 426/417 |
| 4,209,541 | 6/1980 | Clatfelter et al. | 426/430 |
| 4,219,470 | 8/1980 | Karnofsky | 426/656 X |
| 4,265,925 | 5/1981 | Campbell et al. | 426/430 |

FOREIGN PATENT DOCUMENTS 905607 9/1962 United Kingdom .
1009339 11/1965 United Kingdom .

Primary Examiner—Robert Yoncoskie
Assistant Examiner—Marianne S. Minnick

[57] ABSTRACT

This process produces a debittered soybean product which contains a minimal fat content and which has increased water solubility utilizing a first extraction of bitter principles from soybeans with 95% ethanol or equivalent polar solvent followed by a succession of hexane or equivalent non-polar extraction rinses to remove essentially all of the fat content of the soybeans.

5 Claims, No Drawings

PROCESS FOR PRODUCING DEFATTED AND DEBITTERED SOYBEAN MEAL

BACKGROUND OF THE INVENTION

It is well known to defat soybeans by extraction with solvents such as hexane and to use the defatted protein containing residue in the preparation of various food products. Soybeans defatted commercially by the presently accepted art generally contain 1 to 5 percent total lipid and a residue of bound fat, principally phospholipid, amounting to about 1 percent or more. However, it is this residual bound fat that is responsible for much of the residual off-flavor or beaniness and instability in the product. While certain of the prior art extraction procedures have been partially successful in eliminating the characteristic bitter soybean taste, the defatted residue still contains an undesirable mouth-coating factor (or substance), also described as a lard-like taste which sticks in the throat.

It additionally was discovered and disclosed in U.S. Pat. No. 3,721,569, to Steinkraus, which is hereby incorporated by reference, that the residual bound fat including the mouth-coating factor along with remaining bitterness could be removed by extraction with ethyl alcohol together with or followed by extraction with chloroform.

It is the object of the present invention to provide an improved process for producing soybean flakes which are defatted and debittered, which also removes the undesirable mouth-coating factor and produces a product with improved aqueous solubility substantially free of phospholipid.

These and other objects and advantages of the present invention will become apparent on consideration of the extractive methods more fully described in the discussion and examples which follow.

SUMMARY OF THE INVENTION

This process produces a debittered soybean product which contains a minimal fat content and which has increased water solubility utilizing a first extraction of bitter principles from soybeans with ethanol or an equivalent polar solvent followed by a succession of hexane or equivalent non-polar solvent extraction rinses to remove substantially all of the fat content of the soybeans.

DESCRIPTION OF THE INVENTION

The present invention is a method for the preparation of a defatted organoleptically bland soybean meal which unlike prior art processes, produces a product which is suitable for the preparation of aqueous extracts such as milk substitutes. In the present invention dehulled, flaked raw soybeans are extracted with ethyl alcohol (95%) or equivalent polar solvent in order to release the phospholipids and other undesirable flavor-bearing lipids. The ethanol treated soybean flakes are then extracted with a succession or plurality of hexane rinses until substantially all of the fat has been removed. The defatted soybean flakes are desolventized to remove the solvent by applying mild external heat initially at 40° to 60° C. under vacuum producing a final product at a temperature of about 40° C. The defatted soybean flakes are then pulverized to produce a product having improved aqueous solubility being substantially free of phospholipids.

The instant process in its preferred embodiments employs the following treatment steps.

Soybeans are cleaned, size-graded, exposed to circulating hot air (about 99° to 104° C.) for approximately three minutes in order to remove a small amount of moisture from the soybeans causing the cotyledons to shrivel thus facilitating removal of the hulls by passing the soybeans through a properly spaced burr mill. The hulls are subsequently removed by passing the beans through an aspirator. The soybean cotyledons are then flaked by passing the beans through a properly adjusted roller mill.

The soybean flakes are then extracted with undiluted ethanol (95%) or its equivalent. The ethanol can be applied in a stirred vat or by spraying onto the soybean flakes. A succession of 95% ethanol sprays can be used to extract substantially all of the ethanol extractable materials if so desired. The ethanol is then drained from the mixture thereby removing the ethanol soluble materials. If desired, residual ethanol can be recovered from the flakes by vacuum evaporation applying external heat at about 40° C.–60° C. (initial) with a condenser in the line. The final soybean product temperature at recovery is about 40° C.

The soybean flakes with or without residual ethanol are then extracted with a succession of extraction steps utilizing hexane or its equivalent non-polar solvent as the extraction solvent until substantially all of the fat contained in the soybeans is removed. Substantially all of the fat is herein defined as less than 0.4 percent fat (lipid) level per weight of the soybean protein; preferably less than 0.2 percent fat (lipid), most preferably less than 0.1 percent fat.

A succession or plurality of hexane extractions are utilized to increasingly reduce the fat level of the soybean flakes at each extraction step. The hexane utilized in each extraction step can be recycled from the previous extraction step. However, the final hexane rinses must be essentially fat free as initially applied in order to remove the final one percent or less of fat from the soybean flakes. The final hexane extraction liquor can then be recycled as the initial hexane extraction rinse on following batches. The hexane extraction sprays or stirred-vat treatments prior to the final hexane rinse can contain minimal amounts of fat therein consistent with commercial practice. Standard techniques for removal of fat from the hexane after each extraction step can be utilized prior to recycling if too much fat accumulates in the extraction solvent.

The removal of the final one percent of fat from the soybean flakes is dependent upon the initial application of ethanol. Although the 95% ethanol begins to exert its effect as soon as it penetrates the flaked soybeans, it is desirable that the ethanol be applied for at least 15 minutes and preferably for up to one or two hours.

To facilitate removal of residual hexane, the defatted soybean flakes can be rinsed with pure 95% ethanol after the last hexane extraction step and prior to desolventizing under vacuum.

Prior to drying, a substantial portion, such as 80 to 95 percent of the non-polar extraction solvent and extractants are removed from the solvent-protein mixture by conventional methods such as draining or centrifugal separation.

Present commercial drying processes remove retained solvent from defatted soybean products by toasting, steam-stripping or other heat treatments which decrease the water solubility of the soybean product. A soybean product having further improved water solubility is obtained in the present process by desolventizing the final defatted soybean flakes by applying mild external heat at about 40° to 60° C. (initial)-40° C. (final) under vacuum to produce a soybean product having a temperature of about 40° C. A condenser in the line enables recovery of the solvent. The resultant defatted soybean flakes are then pulverized to any desired mesh size.

Suitable polar solvents for use in the present invention in the initial extraction step include but are not limited to: lower alkanols such as methanol, ethanol, propanol, butanol or mixtures thereof. The preferred polar solvent for use in the present invention is 95% ethanol.

Suitable non-polar solvents for use in the second extraction steps for removal of residual fat include but are not limited to: medium alkane solvents such as hexane, pentane, heptane and mixtures thereof. The preferred non-polar solvent for use in the present invention is hexane.

The following example illustrates preparation of the low fat containing soybean products produced by the process of the present invention.

EXAMPLE 1

Unheated, flaked soybeans are extracted for 1 or 2 hours in a stirred vat with 95% ethanol. The ethanol and ethanol soluble products are then drained from the mixture.

The partially defatted flaked soybeans are then rinsed successively with n-hexane or an equivalent solvent containing less than one percent fat and preferably no fat. The hexane rinse is then separated, recovered and recycled to the next hexane extraction step for fat removal from the soybean flakes. These extraction steps are repeated until the fat level of the soybean flakes reaches one percent or less. A final fat-free hexane rinse is then utilized on the soybean flakes to remove substantially all of the final residual fat in the soybeans. The solvent is drained and the resultant soybean flakes can be rinsed with ethanol to facilitate removal of hexane (if desired) and the soybean flakes are vacuum dried by applying external heat at 40° -60° C. (initial)-40° C. (final product temperature). The recovered soybean flakes contain less than 0.1 percent fat and can then be pulverized to the desired mesh size and agglomerated if so desired.

The soybean protein powder recovered by the procedure of Example 1 is more than twice as soluble in hot (80° C.) water and nearly three times as soluble in hot (80° C.) dipotassium phosphate (1%) buffer compared with soxhlet extracted soybean. The product of the instant invention is especially useful as a skim milk substitute or as a base for fluid milk substitutes.

I claim:

1. A process for preparing particulate, organoleptically bland, defatted, debittered soybean product having improved water solubility and reduced phospholipid content, said process comprising the sequential steps of
   (a) extracting utilizing a polar solvent by:
      (1) contacting flaked or pulverized dehulled, unheated, raw soybeans with an extracting medium consisting of an undilute lower alkanol polar solvent for a time period in the range of 15 minutes to two hours;
      (2) separating a substantial amount of the polar solvent together with extractants leaving partially defatted particulate soybean product;
   (b) extracting the product resulting from step (a) utilizing an extracting medium consisting of a non-polar solvent in a plurality of extraction steps to leave less than 0.4 percent fat associated with the product, the last of the extraction steps utilizing non-polar extraction solvent which is essentially fat-free;
   (c) desolventizing the product of step (b) to substantially remove residual solvents.

2. A process as recited in claim 1 wherein the alkanol is ethanol and the non-polar solvent is hexane.

3. A process as recited in claim 2 wherein the undilute alkanol is 95% ethanol.

4. A process as recited in claim 3 wherein the product of step (b) is rinsed with ethanol to facilitate removal of residual hexane prior to desolventizing by heating at 40°-60° C. under vacuum.

5. A process as recited in claim 4 wherein pulverized soybeans are used in step (a).

* * * * *